United States Patent
Endo et al.

(10) Patent No.: US 7,893,962 B2
(45) Date of Patent: Feb. 22, 2011

(54) IMAGE OUTPUT SYSTEM HAVING MULTIPLE DEVICES COMMUNICATION-CONNECTED IN MASTER-SLAVE RELATION

(75) Inventors: Masakatsu Endo, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1070 days.

(21) Appl. No.: 10/506,453

(22) PCT Filed: Feb. 28, 2003

(86) PCT No.: PCT/JP03/02325

§ 371 (c)(1),
(2), (4) Date: Jun. 7, 2005

(87) PCT Pub. No.: WO03/075149

PCT Pub. Date: Sep. 12, 2003

(65) Prior Publication Data

US 2005/0253930 A1  Nov. 17, 2005

(30) Foreign Application Priority Data

Mar. 1, 2002 (JP) .................. P. 2002-056675
Mar. 1, 2002 (JP) .................. P.2002-056676

(51) Int. Cl.
*H04N 5/225* (2006.01)
*G06K 15/00* (2006.01)
*G06F 3/12* (2006.01)

(52) U.S. Cl. ................... 348/207.2; 358/1.14; 358/1.15

(58) Field of Classification Search ............. 348/207.2, 348/207.1, 333.02, 220; 358/1.14, 1.15; 347/3
See application file for complete search history.

(56) References Cited

U.S. PATENT DOCUMENTS

| 5,784,581 | A | * | 7/1998 | Hannah ..................... 710/110 |
| 6,273,535 | B1 | * | 8/2001 | Inoue et al. .................... 347/3 |
| 6,304,313 | B1 | * | 10/2001 | Honma ........................ 355/18 |
| 6,718,412 | B2 | * | 4/2004 | Purcell et al. ............... 710/109 |

(Continued)

FOREIGN PATENT DOCUMENTS

EP  0 679 012  10/1995

(Continued)

OTHER PUBLICATIONS

Abstract of Japanese Patent Publication No. 06-029973, Pub. Date: Feb. 4, 1994, Patent Abstracts of Japan.

(Continued)

*Primary Examiner*—Nhan T Tran
*Assistant Examiner*—Tuan H Le
(74) *Attorney, Agent, or Firm*—Martine Penilla & Gencarella, LLP (57) ABSTRACT

A printer periodically sends a request inquiry command "Interrupt In" to a digital camera at a high rate. The digital camera returns a printer status request, a print request, a print cancel request, etc., to the printer as a reply to "Interrupt In." The camera operates as a usual storage class USB device for the printer except that the camera performs the described operation. Therefore, the printer makes a search for a directory in the camera and reads an image file, a print page layout file, etc., required for print on its own initiative.

1 Claim, 6 Drawing Sheets

U.S. PATENT DOCUMENTS

| | | | |
|---|---|---|---|
| 6,806,978 B1* | 10/2004 | Tamura et al. | 358/1.15 |
| 7,310,112 B1* | 12/2007 | Watanabe | 348/207.1 |
| 2001/0004266 A1* | 6/2001 | Itsukaichi | 348/220 |
| 2001/0022624 A1* | 9/2001 | Tanaka et al. | 348/333.02 |
| 2001/0045966 A1 | 11/2001 | Inoue et al. | |
| 2001/0048534 A1 | 12/2001 | Tanaka et al. | |
| 2002/0021902 A1 | 2/2002 | Hosoda et al. | |
| 2002/0021903 A1 | 2/2002 | Ito et al. | |
| 2002/0105678 A1* | 8/2002 | Shiraiwa | 358/1.15 |

FOREIGN PATENT DOCUMENTS

| | | |
|---|---|---|
| EP | 0 740 452 | 10/1996 |
| EP | 1 139 648 | 10/2001 |
| JP | 06-029973 | 2/1994 |
| JP | 06-125590 | 5/1994 |
| JP | 09-023239 | 1/1997 |
| JP | 09-190295 | 7/1997 |
| JP | 09-219712 | 8/1997 |
| JP | 10-226139 | 8/1998 |
| JP | 10-228355 | 8/1998 |
| JP | 11-296316 | 10/1999 |
| JP | 11-298833 | 10/1999 |
| JP | 11-327855 | 11/1999 |
| JP | 2000-057430 | 2/2000 |
| JP | 2000-118086 | 4/2000 |
| JP | 2000-307911 | 11/2000 |
| JP | 2000-350127 | 12/2000 |
| JP | 2001-016539 | 1/2001 |
| JP | 2001-177746 | 6/2001 |
| JP | 2001-290612 | 10/2001 |
| JP | 2001-333387 | 11/2001 |
| JP | 2002-055936 | 2/2002 |
| JP | 2002-369067 | 12/2002 |

OTHER PUBLICATIONS

Abstract of Japanese Patent Publication No. 06-125590, Pub. Date: May 6, 1994, Patent Abstracts of Japan.
Abstract of Japanese Patent Publication No. 09-023239, Pub. Date: Jan. 21, 1997, Patent Abstracts of Japan.
Abstract of Japanese Patent Publication No. 09-190295, Pub. Date: Jul. 22, 1997, Patent Abstracts of Japan.
Abstract of Japanese Patent Publication No. 09-219712, Pub. Date: Aug. 19, 1997, Patent Abstracts of Japan.
Abstract of Japanese Patent Publication No. 10-226139, Pub. Date: Aug. 25, 1998, Patent Abstracts of Japan.
Abstract of Japanese Patent Publication No. 10-228355, Pub. Date: Aug. 25, 1998, Patent Abstracts of Japan.
Abstract of Japanese Patent Publication No. 11-296316, Pub. Date: Oct. 29, 1999, Patent Abstracts of Japan.
Abstract of Japanese Patent Publication No. 11-298833, Pub. Date: Oct. 29, 1999, Patent Abstracts of Japan.
Abstract of Japanese Patent Publication No. 11-327855, Pub. Date: Nov. 30, 1999, Patent Abstracts of Japan.
Abstract of Japanese Patent Publication No. 2000-057430, Pub. Date: Feb. 25, 2000, Patent Abstracts of Japan.
Abstract of Japanese Patent Publication No. 2000-118086, Pub. Date: Apr. 25, 2000, Patent Abstracts of Japan.
Akisada Watanabe, *Basic Knowledge of USB, Transistor Technology*, Japan, CQ Press, Jun. 2000, vol. 37, No. 6, pp. 180-189.
ASCII/V, New Technology, Jul. 2000, vol. 6, No. 7, pp. 226-229.
Horihisa Tanabe, *Changes and Expansions of USB 2.0*, Interface, Japan, CQ Press, Sep. 2000, vol. 26, No. 9, pp. 106-111.
Abstract of Japanese Patent Publication No. 2000-307911, Pub. Date: Nov. 2, 2000, Patent Abstracts of Japan.
Abstract of Japanese Patent Publication No. 2000-350127, Pub. Date: Dec. 15, 2000, Patent Abstracts of Japan.
Abstract of Japanese Patent Publication No. 2001-016539, Pub. Date: Jan. 19, 2001, Patent Abstracts of Japan.
Abstract of Japanese Patent Publication No. 2001-177746, Pub. Date: Jun. 29, 2001, Patent Abstracts of Japan.
Abstract of Japanese Patent Publication No. 2001-290612, Pub. Date: Oct. 19, 2001, Patent Abstracts of Japan.
Abstract of Japanese Patent Publication No. 2001-333387, Pub. Date: Nov. 30, 2001, Patent Abstracts of Japan.
Abstract of Japanese Patent Publication No. 2002-055936, Pub. Date: Feb. 20, 2002, Patent Abstracts of Japan.
Abstract of Japanese Patent Publication No. 2002-369067, Pub. Date: Dec. 20, 2002, Patent Abstracts of Japan.

* cited by examiner

IMAGE OUTPUT SYSTEM HAVING MULTIPLE DEVICES COMMUNICATION-CONNECTED IN MASTER-SLAVE RELATION

TECHNICAL FIELD

This invention relates to a unit-to-unit communication control method suited for a print system, etc., including a digital camera and a digital printer connected by a communication interface having master-slave relation, such as a USB (Universal Serial Bus), for example.

The USB is known as one of communication interfaces having master-slave relation. That is, one of the two units connected to each other by the USB is "USB host" taking the initiative in communications and the other is "USB device" operating as a slave in response to a control command from the USB host.

The USB is widely available as a communication interface between a personal computer and a peripheral machine. A general personal computer operating system (OS) for supporting the USB includes as standard a USB controller as the USB host. Of course, a peripheral machine for supporting the USB includes a USB controller as a USB device.

The USB devices involve a plurality of classes (types) different in communication control method. The device classes defined in the USB standard include storage class, HID class, STI class, printer class, and the like. So long as the peripheral machine functions as the USB device of any device class defined in the standard, the USB controller included as standard in the personal computer OS can normally communicate with the peripheral machine. However, if the peripheral machine operates as an out-of-standard device class (for example, an original class defined by the peripheral machine manufacturer), it is not guaranteed that the USB controller included as standard in the personal computer OS can normally communicate with the peripheral machine.

One of the peripheral machines of the personal computer is a digital camera. As the USB is widely available as mentioned above, the model including a USB device function is also mainstream in the digital camera. For the digital camera, it is considered that the desirable device class is "storage class," because in the device class, the personal computer can handle the digital camera as data storage and can make a search for a directory in the digital camera as desired for reading/writing any desired image file.

By the way, in digital printers such as ink jet printers and laser printers, a digital printer of direct connection type that can be connected to directly to a digital camera without intervention of a personal computer and read image data directly from the digital camera for printing. In the digital printer of direct connection type, the USB is also preferred as a communication interface with a digital camera. In this case, it is considered that preferably the printer functions as the USB host and the digital camera functions as the USB device of the storage class, because, in this case, if the digital camera can function as the USB device of the storage class, it can also be connected to the personal computer and can also be connected to the direction connection type printer.

Thus, in the print system of direct connection type wherein the printer operates as the USB host and the digital camera operates as the USB device, the printer handles the digital camera simply as data storage. In this case, according to the USB standard, means for sending a control command independently from the printer of the USB host to the digital camera of the USB device is provided; in contrast, however, means for sending a control command independently from the digital camera of the USB device to the printer of the USB host is not provided (namely, is not defined in the standard). Consequently, if the USB standard is simply followed, the following problem occurs:

In the print system of direct connection type as described above, user operation of selection of the image to be printed, setting of a print condition, a print request, and the like can be performed using the printer; in contrast, however, the user operation is hard to perform using the digital camera. However, the user can easily perform the above-mentioned operation using the digital camera rather than the printer, because the user can easily operate the digital camera with the digital camera held with one hand and can see an image on a high-definition color liquid crystal display panel of the digital camera for selection.

It is considered that a similar problem is involved not only in the print system of direct connection type described above, but also in a system of any other type using a communication interface having master-slave relation.

DISCLOSURE OF THE INVENTION

It is therefore an object of the invention to make it possible to control an image output unit by button operation on an image source unit as a slave on communication control when the image output unit such as a digital printer and the image source unit such as a digital camera are connected through a communication interface having the master-slave relation such as a USB. To accomplish the object, according to the invention, there is provided an image output system including:

an image source unit;
an image output unit; and
a communication interface for connecting the image source unit and the image output unit,
the image source unit having:
an operation unit for issuing an image output instruction;
request command generation means being responsive to the image output instruction for generating a request command for requesting the image output unit to perform image output operation based on predetermined output condition setting;
request command transmission means for transmitting the request command through the communication interface to the image output unit;
data storage for storing a resource file used for the image output unit to perform the image output operation; and
slave communication means for accessing the resource file in the data storage as controlled in a slave manner by the image output unit, and
the image output unit having:
request command reception means for receiving the request command through the communication interface from the image source unit;
resource file acquisition means for acquiring the resource file through the communication interface from the image source unit by controlling the slave communication means; and
control means for controlling the image output operation based on the received request file and the acquired resource file.

According to the invention, there is also provided an image output system including:
an image source unit;
an image output unit; and
a communication interface for connecting the image source unit and the image output unit, the image source unit having:

request command generation means for generating a request command for requesting the image output unit to perform image output operation based on predetermined output condition setting; and resource file creation means for creating a resource file used for the image output unit to perform the image output operation, and the image output unit having:

request command reception means for receiving the request command through the communication interface from the image source unit;

resource file acquisition means for acquiring the resource file through the communication interface from the image source unit; and control means for controlling the image output operation based on the received request file and the acquired resource file.

According to the invention, there is also provided an image output method including the steps of:

connecting an image source unit and an image output unit through a communication interface;

in the image source unit, generating a request command for requesting the image output unit to perform image output operation based on predetermined output condition setting;

in the image source unit, creating a resource file used for the image output unit to perform the image output operation;

in the image output unit, receiving the request command through the communication interface from the image source unit;

in the image output unit, acquiring the resource file through the communication interface from the image source unit; and in the image output unit, controlling the image output operation based on the received request file and the acquired resource file.

According to the invention, there is also provided an image source unit being connected to an image output unit through a communication interface, including:

request command generation means for generating a request command for requesting the image output unit to perform image output operation based on predetermined output condition setting;

resource file creation means for creating a resource file used for the image output unit to perform the image output operation; and data storage for storing the resource file.

Preferably, the request command is transmitted to the image output unit through the communication interface in response to an inquiry issued from the image output unit, and the resource file is transmitted to the image output unit through the communication interface in response to a request issued from the image output unit.

Preferably, the image source unit further includes an operation unit for issuing an image output instruction, wherein the request command is generated in response to the image output instruction.

According to the invention, there is also provided an information processing method executed in an image source unit connected to an image output unit through a communication interface, the method including the steps of:

generating a request command for requesting the image output unit to perform image output operation based on predetermined output condition setting;

creating a resource file used for the image output unit to perform the image output operation; and storing the created resource file in data storage.

Preferably, the information processing method further includes the steps of transmitting the request command to the image output unit through the communication interface in response to an inquiry issued from the image output unit; and transmitting the resource file to the image output unit through the communication interface in response to a request issued from the image output unit.

Preferably, the information processing method further includes the step of issuing an image output instruction as an operation unit is operated, wherein the request command is generated in response to the image output instruction.

According to the invention, there is also provided an image output unit being connected to an image source unit through a communication interface, including:

request command reception means for receiving a request command for requesting the image output unit to perform image output operation based on predetermined output condition setting through the communication interface from the image source unit;

resource file acquisition means for acquiring a resource file used for the image output unit to perform the image output operation through the communication interface from the image source unit; and control means for controlling the image output operation based on the received request file and the acquired resource file.

According to the invention, there is also provided an information processing method executed in an image output unit connected to an image source unit through a communication interface, the method including the steps of:

checking whether or not a request command for requesting the image output unit to perform image output operation based on predetermined output condition setting is generated in the image source unit;

when it is checked that the request command is generated, receiving the request command through the communication interface from the image source unit;

acquiring a resource file used for the image output unit to perform the image output operation through the communication interface from the image source unit; and controlling the image output operation based on the received request file and the acquired resource file.

According to the invention, there is also provided a data communication system including:

a master unit;

a slave unit; and a communication interface for connecting the master unit and the slave unit, the slave unit having request command generation means for generating a request command for requesting the master unit to perform predetermined operation based on predetermined operation condition setting, the master unit having inquiry command transmission means for periodically transmitting an inquiry command through the communication interface to the slave unit, the slave unit having request command transmission means for transmitting the request command through the communication interface to the master unit if the request command is generated when the inquiry command is received, the master unit having:

request command reception means for receiving the request command through the communication interface from the slave unit; and control means for controlling the predetermined operation based on the received request file.

According to the invention, there is also provided an information processing method including the steps of:

connecting a master unit and a slave unit through a communication interface, in the slave unit, generating a request command for requesting the master unit to perform predetermined operation based on predetermined operation condition setting, in the master unit, periodically transmitting an inquiry command through the communication interface to the slave unit, in the slave unit, transmitting the request command through the communication interface to the master unit if the request command is generated when the inquiry command is received, in the master unit, receiving the request command through the communication interface from the slave unit; and in the master unit, controlling the predetermined operation based on the received request file.

Preferably, the information processing method further includes the steps of: in the slave unit, creating a resource file used for the master unit to perform the predetermined operation; in the slave unit, storing the created resource file in data storage; and in the master unit, acquiring the resource file through the communication interface from the slave unit, wherein the predetermined operation is controlled based on the received request file and the acquired resource file.

According to the invention, there is also provided a slave unit being connected to a master unit through a communication interface, including:

request command generation means for generating a request command for requesting the master unit to perform predetermined operation based on predetermined operation condition setting; and request command transmission means for transmitting the request command to the master unit through the communication interface in response to an inquiry issued from the master unit.

Preferably, the slave unit further includes resource file creation means for creating a resource file used for the master unit to perform the predetermined operation; data storage for storing the created resource file; and resource file transmission means for transmitting the resource file to the master unit through the communication interface in response to a request issued from the master unit.

Preferably, the slave unit further includes an operation unit for issuing an operation instruction, wherein the request command is generated in response to the operation instruction.

According to the invention, there is also provided an information processing method executed in a slave unit being connected to a master unit through a communication interface, the method including the steps of:

generating a request command for requesting the master unit to perform predetermined operation based on predetermined operation condition setting; and transmitting the request command to the master unit through the communication interface in response to an inquiry issued from the master unit.

Preferably, the information processing method further includes the steps of creating a resource file used for the master unit to perform the predetermined operation; storing the created resource file in data storage; and transmitting the resource file to the master unit through the communication interface in response to a request issued from the master unit.

Preferably, the information processing method further includes the step of issuing an operation instruction as an operation unit is operated, wherein the request command is generated in response to the operation instruction.

Preferably, the information processing method further includes the step of displaying the operation condition setting on a display panel in response to the operation instruction.

Preferably, the slave unit includes a digital camera and the master unit includes a digital printer.

Preferably, the inquiry command is periodically transmitted from a USB host controller in the master unit, and when the inquiry command is received, if the request command is generated, a storage class USB device controller in the slave unit transmits the request command.

Preferably, the information processing method further includes the step of storing the generated request command in data storage in a predetermined file format by a storage class USB device controller, wherein a USB host controller in the master unit periodically checks whether or not the read request command is stored in the data storage.

Preferably, the resource file includes an image file in a general-purpose format including a JPEG format, the method further including the step of converting an image file in the general-purpose format into a data format dependent on the master unit.

According to the invention, there is also provided a master unit being connected to a slave unit through a communication interface, including:

inquiry command transmission means for periodically transmitting an inquiry command through the communication interface to the slave unit, request command reception means for receiving a request command for requesting the master unit to perform predetermined operation based on predetermined operation condition setting through the communication interface from the slave unit; and control means for controlling the predetermined operation based on the received request file.

Preferably, the master unit further includes resource file acquisition means for acquiring a resource file used for the master unit to perform the predetermined operation through the communication interface from the slave unit, wherein the control means controls the predetermined operation based on the received request file and the acquired resource file.

According to the invention, there is also provided an information processing method executed in a master unit connected to a slave unit through a communication interface, the method including the steps of:

periodically transmitting an inquiry command for checking whether or not a request command for requesting the master unit to perform predetermined operation based on predetermined operation condition setting is generated in the slave unit through the communication interface to the salve unit;

when it is checked that the request command is generated, receiving the request command through the communication interface from the slave unit; and controlling the predetermined operation based on the received request file.

Preferably, the information processing method further includes the step of acquiring a resource file used for the master unit to perform the predetermined operation through the communication interface from the slave unit, wherein the predetermined operation is controlled based on the received request file and the acquired resource file.

Preferably, the resource file is acquired at the timing dependent on the condition of the master unit.

Preferably, the slave unit includes a digital camera and the master unit includes a digital printer.

Preferably, the inquiry command is periodically transmitted from a USB host controller in the master unit, and when the inquiry command is received, if the request command is generated, a storage class USB device controller in the slave unit transmits the request command.

Preferably, the generated request command is stored in data storage in a predetermined file format by a storage class USB device controller, and the information processing method further includes the step of periodically controlling the slave unit by a USB host controller so as to check whether or not the read request command is stored in the data storage.

Preferably, the operation condition setting is described in either the request command or the resource file.

Preferably, the resource file includes an image file in a general-purpose format including a JPEG format, and the information processing method further includes the step of converting an image file in the general-purpose format into a data format dependent on the master unit.

BEST MODE FOR CARRYING OUT THE INVENTION

Figure 1:
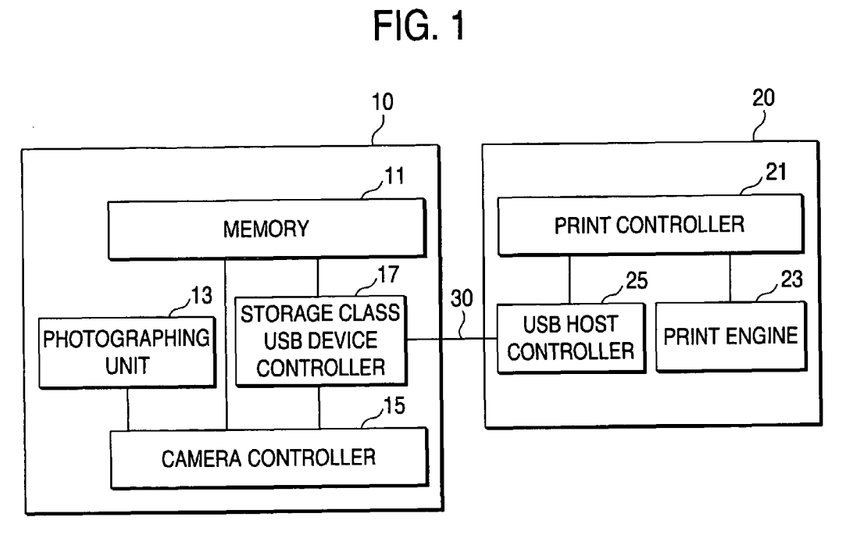
FIG. 1 is a block diagram to show the general configuration of a print system of direction connection type according to a first embodiment of the invention.

In a print system of direct connection type according to a first embodiment of the invention, a digital camera 10 and a digital printer 20 such as a color ink jet printer or a color laser printer is directly connected through a USB communication interface cable 30, as shown in FIG. 1. The digital camera 10 includes memory 10 for retaining a photo image file (for example, a JPEG file or any other general-purpose format file), a photographing unit 13 for taking a photograph and converting into an electric signal, a camera controller 15 for controlling the operation of the parts of the camera 10, and a USB device controller 17 for communicating with a USB host such as the digital printer 20.

The camera controller 15 includes various operation buttons including a shutter button, a color liquid crystal display panel, and the like although not shown. The camera controller 15 drives the photographing unit 13 for taking a photograph in response to shutter button operation, receives the electric signal of the taken photograph from the photographing unit 13, creates an image file, writes the image file into the memory 11, and reads any desired image from the memory 11 in response to predetermined image reference button operation for displaying the image on the color liquid crystal display panel. Further, the camera controller 15 generates a control command for making a request for acquiring the printer status (printer status request) on a regular basis, selects the image file to be printed out of the memory 11 in response to image selection button operation of the user, generates print set data representing setting of print conditions (for example, the number of print sheets, the paper type, the paper size, the print quality, image correction, print layout, the image to be printed, etc.) in response to print setting button operation of the user, generates a control command for making a request for print execution containing the print set data (print request) in response to print request button operation of the user following the image selection button operation, and generates a control command for making a request for print cancel (print cancel request) in response to print cancel button operation of the user.

The USB device controller 17 has a function of communicating with the USB host in compliance with the USB standard as the USB storage class device and thus enables the USB host to make a search for various directories in the memory 11 and read/write any desired image file. Further, the USB device controller 17 has an additional function complying with the principle of the invention. That is, this additional function enables the USB device controller 17 to transmit a control command such as a printer status request, a print request, or a print cancel request generated by the camera controller 15 to the digital printer 20 in a substantially equal mode to that of transmitting the control command independently from the digital camera 10 (namely, substantially with no delay and immediately when the control command is generated) according to a method described later.

The digital printer 20 includes a print controller 21 for returning the printer status, reading the image to be printed from the memory 11, rendering the print image, and performing other various types of control in response to a printer status request, a print request, a print cancel request, etc., from the digital camera 10, a USB host controller 25 for communicating with a USB device as the USB host, a print engine 23 for printing out under the control of the print controller 21, and the like.

The print controller 21 includes a function of receiving an image file in a general-purpose compression format such as a JPEG file or any other general-purpose format file from the digital camera 10 and decompressing the image file into bit map image data, a color conversion function of converting RGB pixel values of the bit map image data into CMYK pixel values, and a half toning function of converting pixel values of multiple-step gradation of the bit map image data into pixel values of area coverage gradation representing dots and blank. Thus, the digital camera 10 need not include the functions of decompressing the image file to be printed such as a JPEG file in the memory 11, executing color conversion of the image file, and half toning of the image file, and may provide the image file for the digital printer 20 intact. Consequently, the configuration of the digital camera 10 need not be customized for each model of digital printer 20 and the merit of using a general-purpose digital camera as the digital camera 10 can be provided.

The USB host controller 25 has a function of accessing the memory 11 in the digital camera 10 functioning as the storage class USB device in compliance with the USB standard, thereby reading/writing any desired data in any desired directory. Further, the USB host controller 25 has an additional function complying with the principle of the invention. That is, this additional function enables the USB host controller 25 to receive the above-described printer status request, print request, print cancel request, etc., from the digital camera 10 in a substantially equal mode to that of transmitting the request, etc., independently from the digital camera 10 (namely, substantially with no delay and immediately when the control command is generated) according to a method described later.

Thus, the additional functions of the USB device controller 17 of the digital camera 10 and the USB device controller 25 of the digital printer 20 complying with the principle of the invention enable the digital camera 10 substantially independently to perform control for or work upon the digital printer 20 with respect to print condition setting, print request, etc. Here, it is to be noted that the additional functions do not hinder the communication function between the USB host and the USB storage class device defined in the USB standard (namely, make the function remain effective) as understood from the description given later. Therefore, to connect the digital camera 10 to a personal computer through the USB, the USB host controller included as standard in the OS of the personal computer can recognize the digital camera 10 as a USB storage class device and can normally communicate with the digital camera (of course, the personal computer ignores the additional functions described above). This means that to connect the digital camera 10 to a personal computer through the USB, a special USB controller dedicated to the digital camera 10 need not be installed in the personal computer, providing a large merit for the user.

Figure 2:
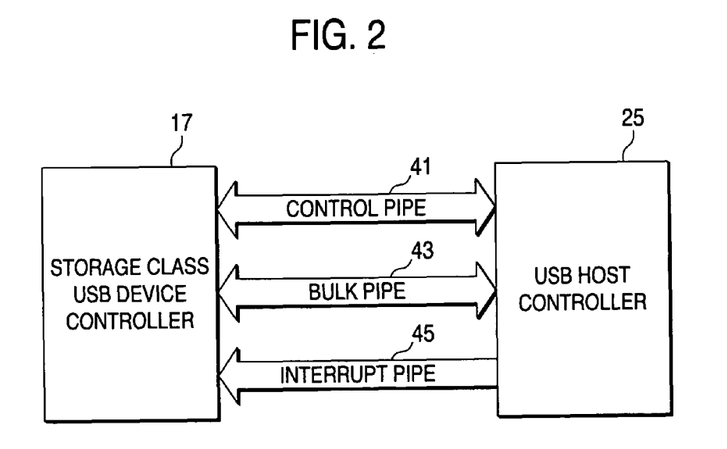
FIG. 2 is a block diagram to show logical pipes (logical communication channels) used when a USB device controller of a digital camera and a USB device controller of a digital printer communicate with each other.

The additional functions will be discussed below in detail:

As shown in FIG. 2, the three types of communication pipes (communication channels) of a control pipe 41, a bulk pipe 43, and an interrupt pipe 45 are used between the USB device controller 17 and the USB host controller 25. Here, the control pipe 41 is used to transmit various control commands from the digital camera 10 to the digital printer 20 and from the digital printer 20 to the digital camera 10. The bulk pipe 43 is used for data transmission such as transmission of an image file from the digital camera 10 to the digital printer 20 and transmission of the printer status from the digital printer 20 to the digital camera 10. The interrupt pipe 45 is used to transmit a request inquiry command of "Interrupt In" from the digital printer 20 to the digital camera 10.

These three types of pipes are all defined in the USB standard. However, the USB standard does not make any definition as to use of the interrupt pipe 45 concerning communications of a USB storage device. In the embodiment, as the effective use of the interrupt pipe 45 is made, various control commands can be sent substantially independently from the digital camera 10 of the USB storage type device to the digital printer 20 of the USB host. That is, while the digital printer 20 is connected with the digital camera 10 through the USB, it sends an "Interrupt In" command through the interrupt pipe 45 to the digital camera 10 periodically at very high speed viewed from the user, such as at least one per millisecond, for example. Whenever the digital camera 10 receives the "Interrupt In" command, it returns a response to the command through the control pipe 41 to the digital printer 20. In this case, if a control command such as a printer status request, a print request, or a print cancel request described above is generated in the digital camera 10 at the point in time at which the "Interrupt In" command is received, the digital camera 10 returns the control command to the digital printer 20 as a response to the "Interrupt In" command. The digital printer 20 interprets the returned control command and executes the operation requested by the digital printer 10 (for example, return of the printer status, execution of print, cancel of print, etc.). Consequently, it is made possible to cause the digital printer 20 to operate under the substantially initiative control of the digital camera 10.

To execute print in response to the print request, the digital printer 20 reads various data resources required for print (for example, an image file to be printed, a definition file of print page layout, etc.) on its own initiative from the digital camera 10 using the fact that the digital camera 10 is of the storage class. Thus, the digital camera 10 may perform the operation as the storage class, of previously recording the data resources required for print in its own memory 11 and reading the data resources in response to a read request from the digital printer 20.

Figure 3:
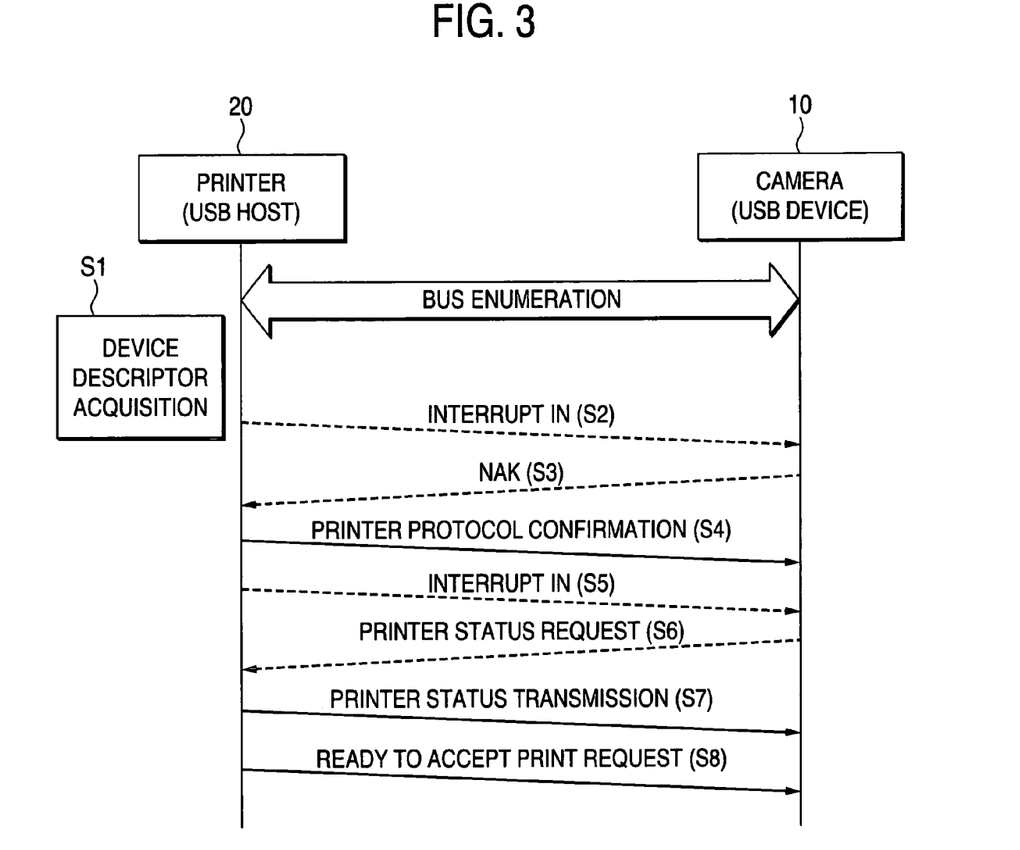
FIG. 3 is a sequence chart to show an example of an initial communication procedure just after communication connection between the digital printer and the digital camera through USB is established.

The communication flow between the digital printer 20 and the digital camera 10 through the USB will be discussed below more specifically with reference to FIGS. 3 to 5:

FIG. 3 shows an example of an initial flow of communications conducted in the beginning when communication connection between the digital printer 20 and the digital camera 10 through the USB is established.

When both the digital printer 20 and the digital camera 10 are connected by a USB communication cable in a state in which they are already powered on or when both the digital printer 20 and the digital camera 10 are powered on in a state in which they are already connected by a USB communication cable, USB communication connection is established between the digital printer 20 and the digital camera 10. When the USB communication connection is established, the USB host controller 25 of the digital printer 20 acquires a "device descriptor" describing the configuration of the digital camera as the USB device from the USB device controller 17 of the digital camera 10 (step S1). The device descriptor from the digital camera 10 contains an "interface descriptor" describing that the digital camera 10 is a storage class device. The interface descriptor contains a "string descriptor" listing a plurality of end points of the USB used by the digital camera 10 (end points at which a packet is transmitted or received using any of the three types of pipes 41, 43, 45 shown in FIG. 2). This string descriptor specifically describes an "Interrupt In" end point of an additional end point complying with the principle of the invention in addition to end points to be possessed by the storage class device defined in the USB standard (for example, "Bulk Out" end point and "Bulk In" end point). Therefore, the USB host controller 25 of the digital printer 20 recognizes that the digital camera 10 is a storage class device and a device using an "Interrupt In" command (a command for making an inquiry about USB device request) from the interface descriptor and the string descriptor.

In this connection, to connect the digital printer 20 to a USB port of a personal computer, the device descriptor of the same contents as described above is sent to the personal computer, but the USB host controller included as standard in the OS of the personal computer ignores the additional "Interrupt In" end point. Therefore, the digital printer 20 operates as a usual storage class device not using "Interrupt In" with respect to the personal computer.

The printer 20 acquiring the device descriptor of the digital camera 10 sends a "printer protocol confirmation command" to the digital camera 10 through the control pipe 41 within a predetermined short time (for example, within one second) since the point in time (step S4), thereby notifying the digital camera of the type of communication protocol used by the printer 20 (namely, the type of using the "Interrupt In" command), the protocol version, etc.

After the communication connection is established, the printer 20 transmits an "Interrupt In" command through the interrupt pipe 45 to the digital camera 10 periodically at a high rate such as one per millisecond, for example, (step S2, S5, etc.). Whenever the digital camera 10 receives the "Interrupt In" command, it checks whether or not some control command is generated in the digital camera 10 at the point in time. If no control command exists, the digital camera returns a "Nak" message meaning that no request exists as a reply to the "Interrupt In" command through the control pipe 41 to the printer 20 (step S3, etc.). On the other hand, if some control command is generated in the digital camera 10 at the point in time at which the "Interrupt In" command is received, the digital camera 10 returns the control command through the control pipe 41 to the printer 20 as a reply to the "Interrupt In" command (step S6, etc.).

Such control commands include a printer status request, a print request, a print cancel request, and the like as previously described. For example, at step S6 in FIG. 3, a printer status request is returned to the printer 20 as a reply to the "Interrupt In" command at step S5. The printer 20 receiving the printer status request checks the most recent printer status and writes the data indicating the printer status into a predetermined directory in the memory 11 of the digital camera 10 through the bulk pipe 45 (step S7), thereby informing the digital camera 10 of the most recent printer status (and the digital camera 10 displays the printer status on a liquid crystal display panel, etc., although not shown).

If the printer 20 becomes ready to accept a print request after the communication connection is established, upon reception of a first printer status request (step S6), the printer 20 not only sends the printer status data to the digital camera 10 (step S7), but also transmits a message to indicate that the printer is ready to accept a print request through the control pipe 41 to the digital camera 10 (step S8).

The timing at which a printer status request is generated in the digital camera 10 can be set as desired depending on the design of the digital camera 10; for example, it can be set to periodical timing of five-second interval, one-second interval, etc., between the instant at which a print request is issued to the printer 20 and the instant at which print is complete, between the instant at which a print cancel request is issued to the printer 20 and the instant at which print is canceled, etc., for example.

Figure 4:
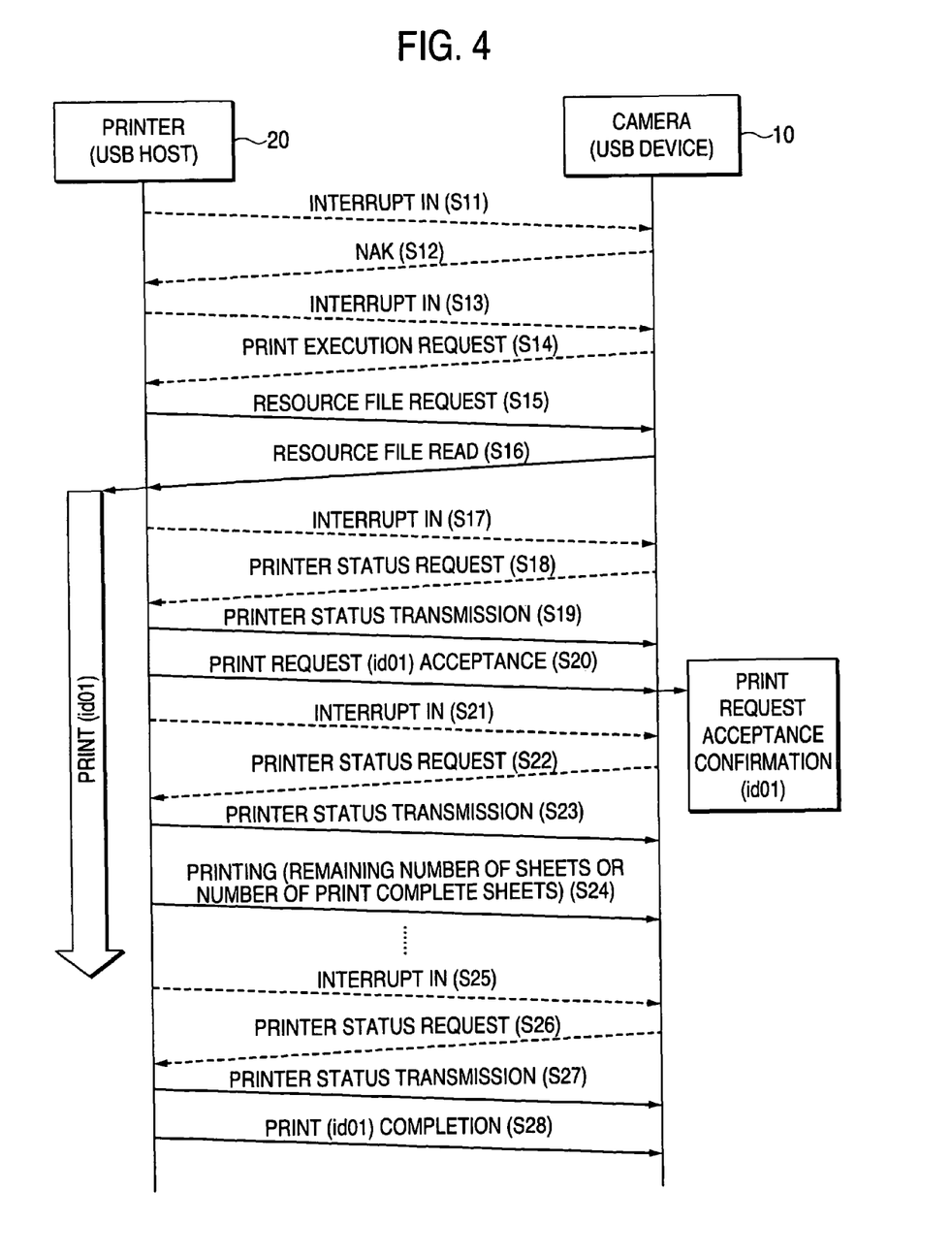
FIG. 4 is a sequence chart to show an example of a communication procedure in the case where a print request is issued from the digital camera and print is executed on the printer.

FIG. 4 shows an example of a communication procedure in the case where a print request is issued from the digital camera 10 and print is executed on the printer 20.

While the printer 20 is connected with the digital camera 10, it continues to send an "Interrupt In" command to the digital camera 10 periodically at a high rate (step S11, S13, S17, S21, S25) as previously described. If a print request is generated upon reception of an "Interrupt In" command as at step S13, the digital camera 10 returns the print request through the control pipe 41 to the printer 20 as a reply to the "Interrupt In" command as shown at step S14. The print request contains print setting data indicating the user-specified print conditions. The print setting data describes the path name and the file name of the image file to be printed in the memory 11 in addition to general print conditions of the number of print sheets, the paper size, the print quality, an image correction method, etc. Further, to print using a predetermined print page layout (layout and dimensions of one or more images printed in one page, layout and dimensions of qualification of a photo frame, an insertion character, an insertion drawing, etc., the path name, the file name, etc.), the print setting data describes the path name, the file name, etc., of a layout file defining the print page layout in the memory 11.

The printer 20 receiving the print request as described above sends a command to read the resource file required for print requested by the print request from the memory 11 of the digital camera 10 (resource file request command) to the digital camera 10 at step S15, and at step S16 reads the resource file required for print independently from the memory 11 of the digital camera 10 through the mediation of the storage class USB device controller 17 of the digital camera 10 making a response to the command and prints using the resource file. Here, the resource files required for print are the image file to be printed (the path name and the file name are described on the print request) and to use a predetermined print page layout, the layout file defining the print page layout (the path name and the file name are described on the print request), a file of a photo frame, insertion text, an insertion drawing, etc., used in the print page layout (the path name and the file name are described in the layout file), etc. The printer 20 reads these resource files on its own initiative from the memory 11 of the digital camera 10 and performs processing of decompression, color conversion, half toning, etc., and thus the digital camera 10 need not perform complicated processing.

The printer 20 continues to send an "Interrupt In" command to the digital camera 10 periodically at a high rate still after accepting the print request. When a first printer status request is returned as at step S18 from the digital camera 10 in response to the "Interrupt In" command after accepting the print request, the printer 20 transmits the printer status (step S19) and sends a message to the effect that the print request is accepted through the control pipe 41 to the digital camera 10 (step S20). The print request acceptance message describes the id number to identify the print job by the digital camera 10 (in the example in the figure, "01"). Accordingly, the digital camera 10 recognizes that the print request of the print job with the id number "01" previously sent is accepted at the printer 20 and the print processing is started. After this, the digital camera 10 can control the operation of the digital camera 10 itself so as not to issue a print request of a new print job until the digital camera receives a notification of print completion concerning the print job with the id number "01."

While the printer 20 prints, whenever the printer 20 receives a printer status request as a reply to the "Interrupt In" command (step S22); it not only transmits the printer status (step S23), but also checks the most recent print state (for example, the remaining number of print incomplete sheets or the number of print complete sheets) and transmits a message indicating the most recent print state through the control pipe 41 to the digital camera 10 (step S24).

Upon completion of the print, when the printer 20 receives a printer status request as a reply to the "Interrupt In" command first after the completion (step S26), the printer 20 not only transmits the printer status (step S27), but also sends a message to the effect that the print is complete through the control pipe 41 to the digital camera 10 (step S28). Since the print completion message contains the id number of the complete print job, the digital camera 10 can recognize which print job is complete from the id number. Upon completion of the print job, the digital camera 10 can control the operation of the digital camera 10 itself so as to be able to issue a print request of a new print job.

Figure 5:
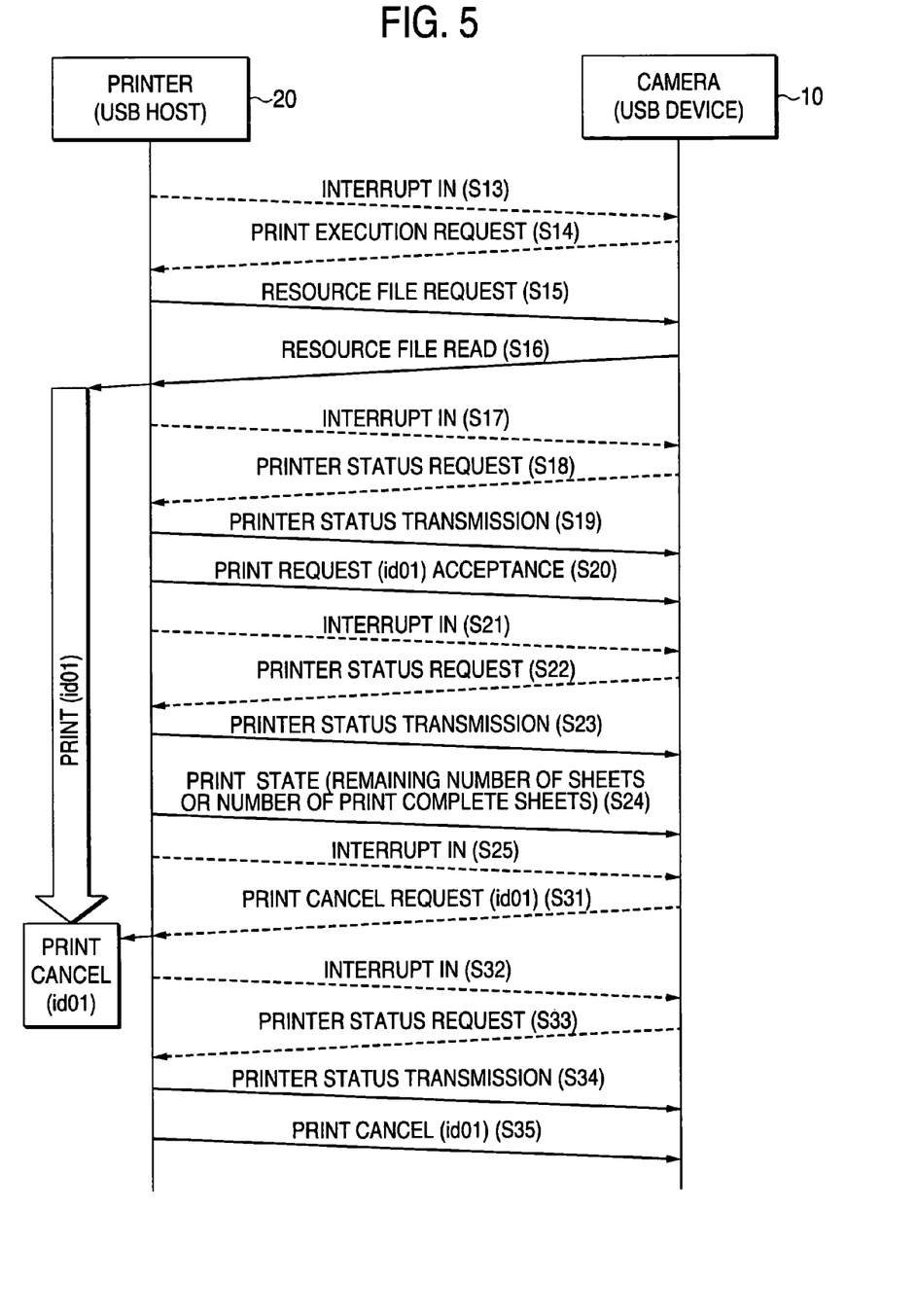
FIG. 5 is a sequence chart to show an example of a communication procedure in the case where a print cancel request is issued after a print request is issued from the digital camera.

FIG. 5 shows an example of a communication procedure in the case where a print cancel request is issued after a print request is issued from the digital camera 10.

Steps S13 to S24 at which a print request is issued and print is executed are similar to steps S13 to S24 in FIG. 4 previously described. After this, if a print cancel request is generated in the digital camera 10 before the print is complete, the print cancel request is sent as a reply to the "Interrupt In" command (step S25) just after the print cancel request from the digital camera 10 through the control pipe 41 to the printer 20 (step S31). The print cancel request contains the id number of the print job to be canceled.

The printer 20 receiving the print cancel request cancels execution of the print job of the id number. When the printer 20 receives a printer status request as a reply to the "Interrupt In" command first after the print is canceled (step S33), the printer 20 not only transmits the printer status (step S34), but also sends a message to the effect that the print is canceled through the control pipe 41 to the digital camera 10 (step S35). Since the print cancel message contains the id number of the canceled print job, the digital camera 10 can recognize which print job is complete from the id number.

As described above, while operating as the storage class USB device for the printer 20, the digital camera 10 returns any of various requests (control commands) generated in the digital camera 10 to the printer 20 as a reply to an "Interrupt In" command (request inquiry) frequently coming from the printer 20, whereby the printer 20 can be operated substantially under the initiative control from the digital camera 10.

Figure 6:
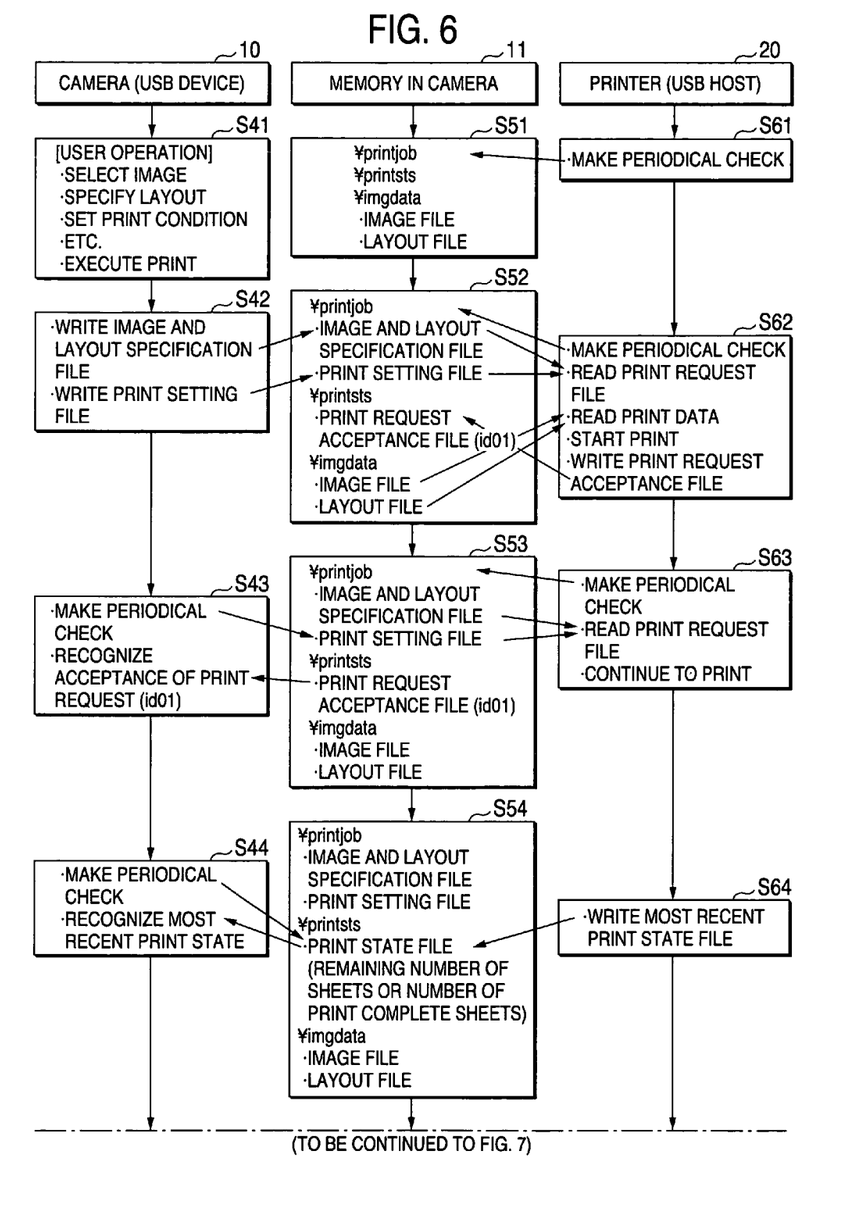
FIGS. 6 and 7 are sequence charts to show an example of a communication procedure of a print system of direction connection type according to a second embodiment of the invention.
Figure 7:
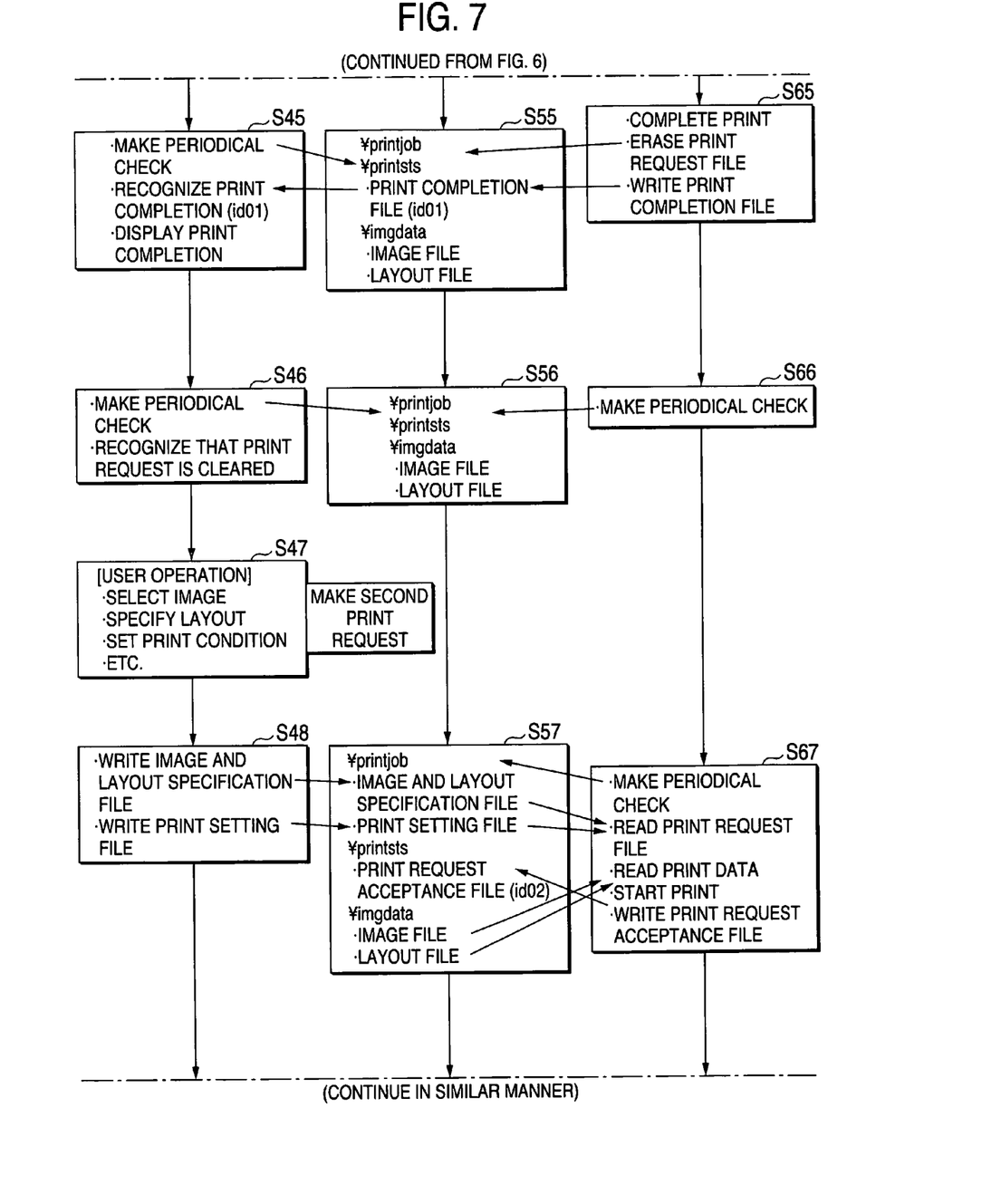

FIGS. 6 and 7 show an example of a communication procedure of a print system of direction connection type according to a second embodiment of the invention.

In the embodiment, a digital camera 10 operates as a usual storage class USB device without using the additional function using the "Interrupt In" command described above. Every control command such as a printer status request, a print request, or print cancel generated in the digital camera 10 is written into a predetermined directory in memory 11 in the form of a file with a specific file name or a specific identifier indicating what command the control command is (for example, a text file, hereinafter referred to as "command file"). A printer 20 checks whether or not a command file exists in the predetermined directory in the memory 11 periodically at a very high rate for the user, such as at least one per millisecond, for example. If a command file exists, the printer 20 reads the command file and recognizes the control command from the digital camera 10. Accordingly, the printer 20 can be operated substantially under the initiative control from the digital camera 10.

An example of a specific communication procedure will be discussed below:

The three types of directories named "¥printjob," "¥printsts," and "¥imgdata," for example, are provided in the memory 11 in the digital camera 10, as shown at step S51 in FIG. 6. The "¥printjob" directory stores a file corresponding to a print request of the digital camera 10 (which will be hereinafter called "print request file"). In the embodiment, the "print request file" involved in one print job is a set of two types of files as described later. In the description to follow, the two types of files are collectively called "print request file." The "¥printsts" directory stores several types of files corresponding to messages indicating the state of each print job from the printer 20 (for example, print request acceptance message, print state message, etc., described above in the preceding embodiment). The "¥imgdata" directory stores various types of resources files used for print, for example, an image file of a taken photograph, a layout file defining a specific print page layout, and an image file, a text file, etc., of a photo frame, insertion text, an insertion drawing, etc., used in the print page layout. In FIG. 6, only one image file and one layout file exist in the "¥imgdata" directory; in fact, however, usually a plurality of image files and a plurality of layout files exist.

Not only the digital camera 10, but also the digital printer 20 previously has knowledge of the three types of directories in the memory 11, the use purposes of the directories, and the meanings of the file names and the identifiers of the files written in the directories. This knowledge may be previously fixedly programmed in the digital printer 20 or when USB communication connection between the digital camera 10 and the digital printer 20 is established, the digital printer 20 may be notified of the knowledge according to a device descriptor or a special declaration statement from the digital camera 10.

It is assumed at step S41 in FIG. 6 that the user uses the digital camera 10 and selects the image to be printed, specifies the print page layout to be used, and performs button operation for preparation for print such as setting of print conditions and then operates a button for giving a print execution instruction. Then, at step S42, the digital camera 10 responds to the button operation and creates an "image and layout specification file" specifying the image to be printed and the print page layout to be used (for example, the path name and file name of the image file, the path name and file name of the layout file, and the like) and a "print setting file" describing setting of the print conditions to be used and writes a set of the two files (namely, the above-mentioned "print request file") into the "¥printjob" directory in the memory 11.

On the other hand, the printer 20 checks the "¥printjob" directory in the memory 11 periodically at a high rate such as at least one per millisecond, for example, as shown at step S61, S62, S63, etc. If no print request file exists in the "¥printjob" directory as at step S61, the printer 20 performs no operation. However, if print request file (namely, image and layout specification file and print setting file) exists in the "¥printjob" directory as at step S62, the printer 20 reads the print request file. The printer 20 grasps the path name and file name of the image file to be printed and the path name and file name of the layout file, described in the print request file, and reads the image file and the layout file from the "¥imgdata" directory in the memory 11.

Further, the printer 20 grasps the path name and file name of the image file or the text file of a photo frame, insertion text, an insertion drawing, etc., described in the layout file and reads the image file or the text file of a photo frame, insertion text, an insertion drawing, etc., from the "¥imgdata" directory in the memory 11 although not shown in the figure. The printer 20 uses the read resource files and starts print processing in accordance with the print condition setting described in the print request file (particularly, the print setting file). At the same time, the printer 20 writes a "print request acceptance file" indicating acceptance of the print request (the file in which the id number of the corresponding print job is written) into the "¥printsts" directory in the memory 11.

If only the same print request file as the already read print request file exists in the "¥printjob" directory as the result of the periodical check as shown at step S63, the printer 20 continues the print processing based on the already read print request file.

The printer 20 writes a print state file describing the most recent print state (for example, the remaining number of unprinted sheets or the number of print complete sheets) into the "¥printsts" directory in the memory 11 as shown at step S64 periodically or each time the print state changes after starting the print processing. As a write method of the print state file, "overwrite" (namely, a method of erasing the previous print request acceptance file or print state file and writing a new print state file) is adopted in the embodiment; however, it need not necessarily be adopted and "additional write" (namely, a method of writing a new print state file without erasing the previous print request acceptance file or print state file) may be adopted.

On the other hand, the digital camera 10 checks the "¥printjob" and "¥printsts" directories in the memory 11 periodically (preferably at a high rate similar to that of the printer 20) as shown at step S43, S44, etc., after issuing the print request at step S42. As the result of the checking, if a print request acceptance file from the printer 20 exists in the "¥printsts" directory, the digital camera 10 reads the print request acceptance file, thereby recognizing that the previously issued print request is accepted at the printer 20 as at step S43. If a print state file exists in the "¥printsts" directory, the digital camera 10 reads the print state file, thereby recognizing the most recent print state as shown at step S44.

FIG. 7 shows the remaining communication procedure following the described communication procedure.

Upon completion of the print, the printer 20 erases the print request file of the completed print job from the "¥printjob" directory in the memory 11 and writes a "print completion file" indicating completion of the print (the id number of the completed print job is written) into the "¥printsts" directory in the memory 11 as shown at step S65. Then, the digital camera 10 finds the print completion file in the "¥printsts" directory in the periodical check and reads the print completion file, thereby recognizing which print job is completed as shown at step S45.

Then, if the digital camera 10 recognizes that no print request file exists in the "¥printjob" directory in the periodical check as shown at step S46, the digital camera 10 becomes ready to issue a new print request. If the user performs button operation for making a new print request as shown at step S47, the digital camera 10 creates a new print request file and writes the print request file into the "¥printsts" directory as shown at step S48 according to the same procedure as previously described. After this, the new print request is read into the printer 20 according to a similar procedure to that previously described (step S67) and print processing is performed accordingly.

As described above, the digital camera 10 writes a control command into a predetermined directory in the memory 11 in the form of a file and the printer 20 frequently monitors the directory, and if a command file is written, immediately the printer reads the command file, whereby if the digital camera 10 functions only as usual storage for the printer 20, the printer 20 can be controlled from the digital camera 10 substantially on its own initiative.

While the embodiments of the invention have been described, such description is for illustrative purposes only, and it is to be understood that the invention is not limited to the embodiments thereof. Therefore, various changes and modifications can be made in the invention without departing from the spirit and scope thereof.

The invention claimed is:

1. A print system comprising:
an image source unit; and
a print unit connected to the image source unit through a USB interface,
wherein the image source unit includes:
an operation unit operated by a user;
a request command generation element generating a print request command to request to perform a print operation under a print condition setting in response to a print instruction operation of the user from the operation unit;
a data storage storing resource files which include an image file required when the print unit performs the printer operation under the print condition setting; and
a USB device controller transmitting the print request command to the print unit, and enabling the print unit to independently access a desired resource file in the data storage as controlled in a slave manner by the print unit, wherein the print unit includes:
a USB host controller receiving the print request command from the image source unit, and independently reading, from the data storage, the desired resource file required for performing the print operation under the print condition setting by controlling the USB device controller, the USB host controller periodically transmitting "Interrupt In" commands to the USB device controller; and
a print element performing the print operation under the print condition setting in response to the print request command,
wherein,
if the print request command is generated when the USB device controller of the image source unit receives the "Interrupt In" command from the USB host controller of the print unit, the USB device controller of the image source unit returns the print request command to the USB host controller of the print unit in response to the "Interrupt In" command,
when the print unit receives the print request command, the print unit transmits, to the image source unit, a resource file request command to read the desired resource file required for performing the print operation requested by the print request command from the data storage of the image source unit, and the print unit independently reads the desired resource file from the data storage of the image source unit and performs the print operation by using the read resource file,
after the print unit receives the print request command,
the print unit transmits the "Interrupt In" command to the image source unit and the image source unit transmits a status request command in response to the "Interrupt In" command,
when the print unit receives the status request command from the image source unit, the print unit transmits, to the image source unit, a status of the print unit and a message that the print unit receives the print request command, while the print unit performs the print operation,
the print unit transmits the "Interrupt In" command to the image source unit and the image source unit transmits a status request command in response to the "Interrupt In" command,
when the print unit receives the status request command from the image source unit, the print unit transmits, to the image source unit, the status of the print unit and a message indicating a state related to the print operation, after the print unit completes the print operation,
the print unit transmits the "Interrupt In" command to the image source unit and the image source unit transmits a status request command in response to the "Interrupt In" command,
when the print unit receives the status request command from the image source unit, the print unit transmits, to the image source unit, the status of the print unit and a message indicating the print operation is completed.

* * * * *